United States Patent [19]

Eichenauer

[11] 4,021,008
[45] May 3, 1977

[54] DEVICE FOR PREVENTING ICE FORMATION ON PARTS OF AIRCRAFT

[75] Inventor: Fritz Eichenauer, Kandel, Pfalz, Germany

[73] Assignee: Fritz Eichenauer, Germany

[22] Filed: May 20, 1975

[21] Appl. No.: 579,152

[30] Foreign Application Priority Data

May 22, 1974 Germany .......................... 2424784
Dec. 5, 1974 Germany .......................... 2457502

[52] U.S. Cl. .......................................... 244/134 D
[51] Int. Cl.² ........................................ B64D 15/12
[58] Field of Search ....... 244/134 R, 134 D, 134 F; 213/528, 549, 553; 338/311; 126/271.1

[56] References Cited

UNITED STATES PATENTS

| | | | |
|---|---|---|---|
| 1,021,230 | 3/1912 | Ball | 338/311 |
| 2,297,540 | 9/1942 | Driscoll | 244/134 D |
| 2,552,075 | 5/1951 | Van Daam | 244/134 D |
| 2,649,267 | 8/1953 | Luke | 244/134 D |
| 2,762,897 | 9/1956 | Vrooman et al. | 244/134 D |
| 2,802,087 | 8/1957 | Chilman | 244/134 D |
| 3,409,759 | 11/1968 | Boicey et al. | 244/134 D |
| 3,465,121 | 9/1969 | Clark | 244/134 D |

Primary Examiner—Trygve M. Blix
Assistant Examiner—Galen L. Barefoot
Attorney, Agent, or Firm—Craig & Antonelli

[57] ABSTRACT

A device for preventing ice formation on parts of aircraft-support surfaces (wings or aerofoils), propellers, rotor blades or the like-comprises electrical resistance heaters embedded in a shell of thermally conducting material (e.g. aluminium sheet or moulding) sheathing the aircraft part. Thermally insulating, thermally conducting and electrically insulating layers may be provided within the shell. The heaters, or some of them, may be controlled by a temperature sensor in or on the shell.

16 Claims, 5 Drawing Figures

DEVICE FOR PREVENTING ICE FORMATION ON PARTS OF AIRCRAFT

The invention relates to a device for preventing the formation of ice upon parts of aircraft, for example supporting surfaces, propellers, rotor blades or the like, by means of resistance heater bodies installed upon said aircraft parts.

Devices are already known using pneumatic chambers with elastic walls, which are mounted, for example, upon the leading edge of support surfaces, which chambers are inflated intermittently with compressed air supplied by means of a special compressor installed on board the aircraft. The adhering ice is intended to be split up by the elastic deformation of the chamber walls. The additional compressor necessary on board the aircraft and the supervision of the pneumatic system involve considerable capital cost. Moreover it is possible for the elastic walls of the chambers to be damaged by the impact of stones, nails or the like, which could cause the failure of the entire system. In addition to these drawbacks, disadvantages are also likely to ensue during operation. For example if the chambers are inflated at an unsuitable time, which could be when the ice is still in an elastic condition or has a thickness which is too small, then the ice will also partake in the deformation movement of the chamber and will maintain this shape when the chambers are decompressed, so that a cavity is formed between the chamber wall and the layer of ice. Whilst further ice is accumulating on the outer side of this ice layer, it is no longer possible to release this because when the chamber is reinflated it merely fills out the cavity available between itself and the layer of ice.

In the abovementioned known devices which operate with electrical resistance heater bodies, wire heater elements are embedded in a rubber mat, which is applied to that portion of the aircraft which is intended to be maintained free of ice. In these cases, on account of the large thermal insulation capacity of rubber, it is necessary to install a considerable output of power in order to maintain the necessary superficial temperatures. This power is so great that during prolonged heating periods the rubber material is rendered brittle. For this reason it is necessary to adopt a partial sectional heating of the entire device in such a manner that at any one time only certain regions are heated whilst others are switched off. This presupposes the inclusion of a suitable control arrangement.

This construction also has the disadvantage that the rubber material is only partially resistant to the weather so that the heater mat can become unusable by embrittlement.

The present invention takes as its basic purpose so to design a device operating with resistance heater bodies that the necessary surface temperatures are attained at a substantially lower power output, and the entire device is resistant to weather influences.

According to the present invention this problem is solved in that the resistance heater bodies are embedded at least partially in a shell partially enclosing the aircraft part and consisting of a material having good thermal conducting capacity.

In the use of this construction all the advantages of the control technique available for electrical heating are maintained, but any local overheating is reliably avoided by the indirect heating and the good thermal transfer taking place in the shell. Furthermore a uniform temperature distribution is achieved over the total surface to be kept free of ice. As contrasted with known systems the capital and installation costs are reduced many times.

Advantageously the shell consists of a flexible aluminium sheet or an aluminium moulding which can be subsequently applied to those parts of the aircraft which are to be maintained free of ice.

In so far as the device is to serve for the de-icing of support surfaces, according to the invention the shell is given a shape which conforms to the aerodynamic profile of the supporting surface, and a wall thickness which reduces from the apex of the profile towards the rear. In this way the aerodynamic properties of the supporting surface are practically not altered or only to a negligible extent. By the adoption of a wall thickness reducing towards the rear there is obtained a temperature distribution which conforms with the usual incidence of ice deposit, so that at every point of the support surface and the portion of the support surface liable to ice formation there is available a sufficient thermal capacity.

According to one practical embodiment of the invention the shell is provided with a plurality of slots at its inner side facing the particular portion of the aircraft, the resistance heater bodies being inserted in these slots. These slots may be arranged in the direction of the longitudinal extension of the aircraft part, for example in the direction of the longitudinal axis of the support surface. In this way there is ensured a uniform thermal dissipation over the longitudinal extension of the aircraft part. Instead of adopting this form of construction it is also possible completely to embed the resistance heater bodies in the shell.

According to a further feature of the invention, a thermally insulating layer, for example of rubber, is arranged between the good thermally conducting shell and its resistance heater bodies on the one hand and the aircraft part on the other hand, this layer serving to prevent an undesired thermal dissipation into the port of the aircraft and being easily capable of conforming to the shape of the aircraft part. In this case it is possible, if necessary, to arrange a thermally conducting foil between the thermal insulation layer and the resistance heater bodies so as to cover the said resistance heater bodies at the rear side thereof, said thermally conducting foil being connected to, or bearing against, the thermally conducting layer so that the rearwardly directed thermal radiation is conveyed into the thermally conducting layer.

Practical experiments have shown that a device constructed in this fashion can operate with one third of the power necessary for the already known devices.

Further details and advantages of the invention will be apparent from the following description of several preferred practical forms thereof with reference to the accompanying drawings.

Figure 1:
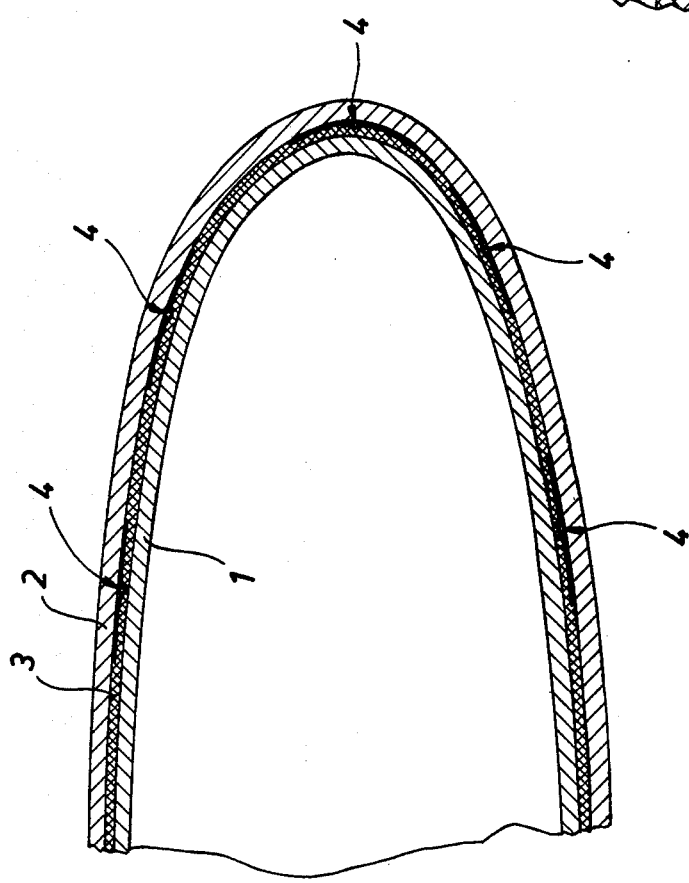
FIG. 1 shows the nose portion of a support surface in cross section with a heater device applied thereto.

FIG. 1 is a schematic representation of the nose section of a support surface 1 of an aircraft which is to be maintained free of ice formation. A heater device in the form of a shell is mounted upon said nose section which is particularly subjected to ice formation, said shell comprising an externally situated thermally conducting layer 2 and an internally situated thermally insulating layer 3. Between these two layers there are arranged resistance heater bodies indicated by the general reference 4. In this practical embodiment the thermally conducting layer 2 consists of a thin aluminium sheet, which allows itself to be easily bent into shape, whilst the thermally insulating layer 3 is preferably of rubber material.

Figure 2:
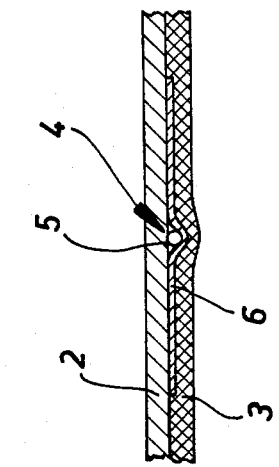
FIG. 2 is an enlarged detail view of a portion of the cross section according to FIG. 1.

In the practical example represented in FIGS. 1 and 2 the resistance heater body 4 is designed to include a miniature tubular heater body having a maximum diameter of 3.5 mm, which is loadable up to about 100 W/cm². The miniature tubular heater body therefore represents only a small load. Such a miniature tubular heater body is shown at 5 in FIG. 2 secured to the thermally insulating layer 2 by means of a thermally conducting foil 6, which may be, for example, also of aluminium. For this purpose thermally conducting foil 6 may advantageously be designed as a self-adhesive foil. The function of the thermally conducting foil 6 is to convey into the thermally conducting layer 2 the heat from the tubular heater body which would normally be directed rearwardly towards the support surface profile 1. The thermally insulating layer 3 of rubber is cemented or vulcanised onto the thermally conducting layer 2 and thermally conducting foil 6.

The device thus constructed can either be integrated from the start into the manufacture of the aircraft section which is to be maintained free of ice, or else it may be subsequently mounted and secured thereto, for example by adhesion, welding, soldering or also by mechanical securement. The subsequent application of the device is possible without difficulty because the aluminium sheet constituting the thermally conducting layer 3 may be easily formed and thus suited to the shape of the aircraft section.

Figure 3:
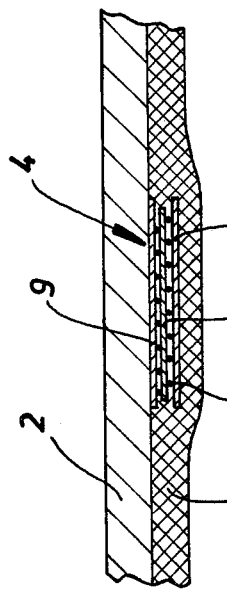
FIG. 3 is another practical form of the invention shown in a section similar to that in FIG. 2.

In the practical embodiment represented in FIG. 3 the resistance heater body 4 arranged between the thermally conducting layer 2 and the thermally insulating layer 3 is otherwise designed. It consists here of one or more wire heater elements, whose heater wires 7 are wound upon a support plate 8 either in helical form or in zig-zag form. At the other side the heater wires 7 are in each case covered by a plate 9, 10 of an electrical insulating material, for example mica. The thermally insulating layer 3 of rubber is vulcanised or cemented onto the resistance heater bodies 4 which are applied to the thermally insulating sheet 2. Again, if necessary, it is possible with this form of construction to secure the resistance heater body 4 to the thermally conducting layer 2 by means of a self-adhesive aluminium foil, such as is described with reference to FIG. 2. In so far as the entire device is adhered to the aircraft part 1 there is the resulting advantage that during testing or overhaul work on the aircraft part, the device can be removed and afterwards employed again. This facility represents a decisive advantage, for example, in the case of propellers, which are required to be subjected to a basic overhaul every 1200 hours. In the case of the devices representing the present state of the art this is only possible by damaging the heater device. As contrasted with the devices now representing the state of the art the invention results in a saving of weight up to 30% and a possible reduction of output power to one third to one sixth of the power required in conventional devices assuming that the same surface temperature is achieved.

The design of the thermally conducting layer according to the invention makes it possible also to provide for manual switching operation. In such a case the time is awaited until the layer of ice reaches a thickness of a certain magnitude. If the heater arrangement is then switched in by hand, then the ice melts at the boundary layer of the thermal conducting layer, whereby a slidable film is formed, from which the formed layer of ice can skid off. This effect is promoted by the fact that the surface of the aluminium thermally conducting layer is very smooth so that ice cannot secure itself in any of the pores. This effect operates against the known phenomenon of the so-called run-back-ice, which builds up in the direction of flight immediately behind the heater device.

Figure 4:
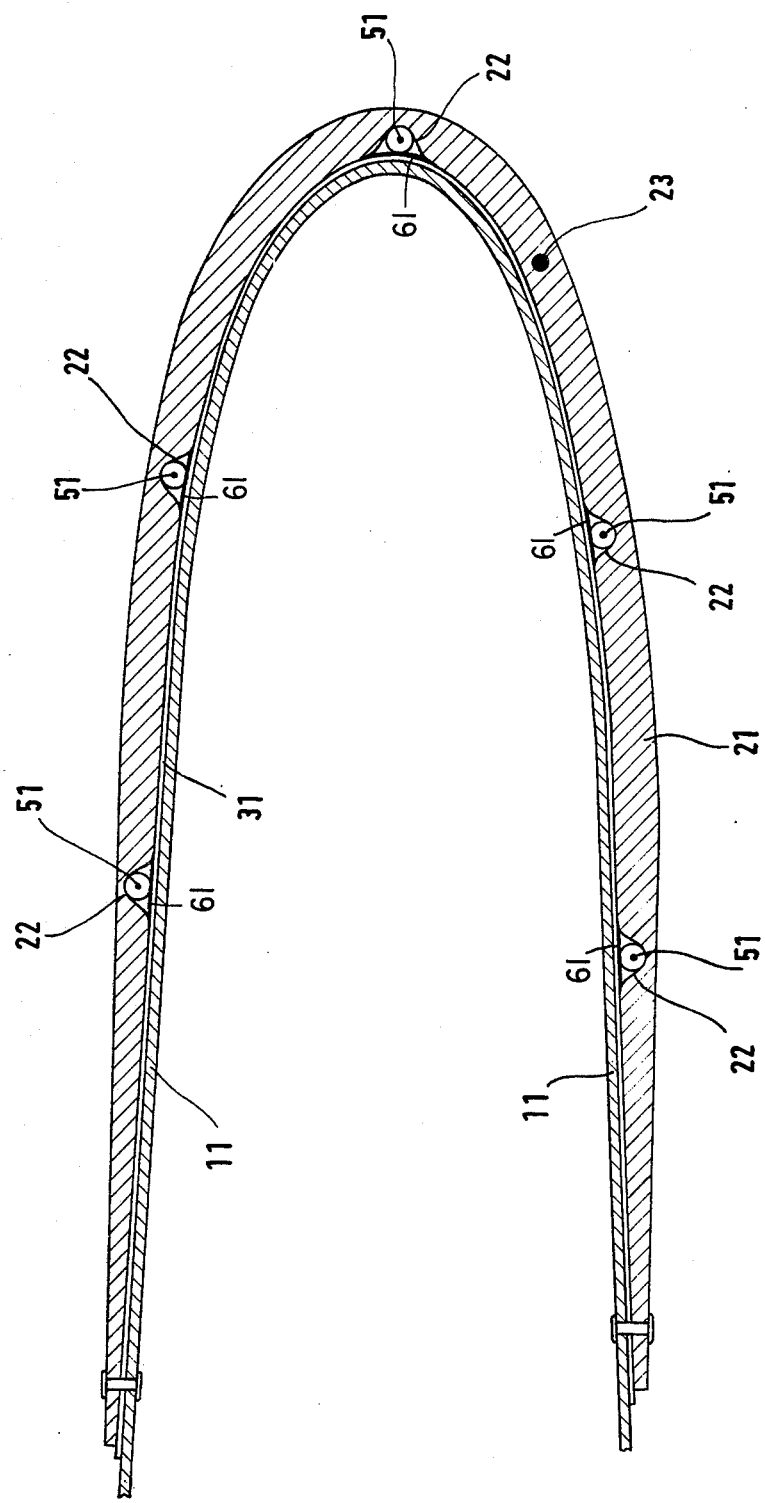
FIG. 4 is a heater device consisting of an aluminium moulding for a support surface.

In FIG. 4 there is represented a different practical form, and this is again shown with reference to a support surface profile 11 of an aircraft. The heater device clads the support surface profile in the form of a shell, which comprises a thermally conducting layer 21 in the form of an aluminium moulding. Between the latter and the support surface profile there is applied a thermally insulating layer 31, this being effected, for example, by cementing, spraying or the like.

The shell 21 is provided at its inner side with a plurality of slots 22 extending along the support surface, in each of which there is inserted a miniature tubular heater body 51. These tubular heater bodies can have the same technical data ratings as those already given above, and may consist, for example, of a chromenickel resistance heater wire, which is situated centrally in a nickel tube, the tubular inner space being filled with magnesium oxide powder or the like. A thermally conducting foil 61 which may be designed as a self-adhesive foil may be provided at the rear of each heater body 51. Furthermore a temperature sensor 23, for example in the form of a capillary tube, is arranged in the shell 21 or in the boundary region between the latter and the insulating layer 31. The shell 21 is secured to the support surface 11 by riveting, cementing or the like.

As is perceivable in the drawing the shell 21 exhibits a reducing wall thickness in the rearward direction from the profile apex of the support surface 11, this graduation of the wall thickness taking into account the shape of the profile of the ice deposit, and ensuring a uniform thermal dissipation over the region which is at risk.

Figure 5:
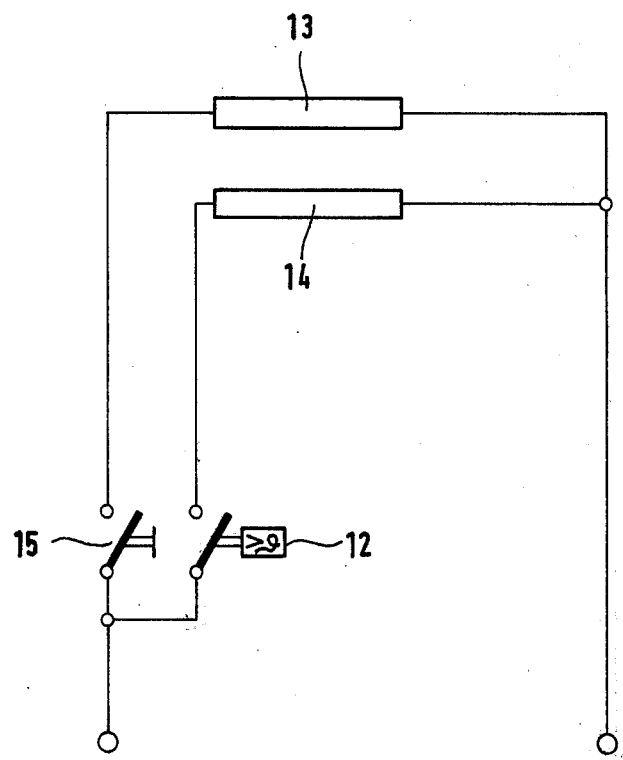
FIG. 5 is a practical form of the circuit for the heater arrangement.

In FIG. 5 there is shown schematically a circuit diagram for the device according to FIG. 4. In this arrangement it is possible for one or more tubular heater bodies 13 to be connected to the aircraft electrical network through a switch 15. The switch 15 may be manually closed when required thereby switching in the tubular heater bodies 13 as a background source of heat. Parallel to these bodies there are arranged one or more tubular heater bodies 14 connectable through a thermostat 12, which can be controlled, for example, by the temperature sensor 23 indicated in FIG. 4. Thus the additional power provided by the tubular heater bodies 14 is automatically switched in when required.

I claim:

1. A device for preventing ice formation upon an external part of an aircraft, comprising at least one electrical resistance heater member mounted upon said part and embedded at least partially in a metallic shell consisting of material of good thermal conductivity partially sheathing said part, said electrical resistance heater member being a miniature tubular heater.

2. A device according to claim 1, wherein said part has a streamlined profile with an apex, and said shell has a wall thickness which reduces rearwardly from said apex.

3. A device according to claim 1, comprising a plurality of said electrical resistance heater members, said shell being provided, at its inner side facing said part, with a plurality of slots in which the resistance heater members are inserted.

4. A device according to claim 3, wherein the slots are arranged in the direction of longitudinal extension of said part.

5. A device according to claim 1, wherein said miniature tubular heater has a diameter of about 3.5 millimeters.

6. A device according to claim 1, further comprising a thermally insulating layer provided between said shell and said part.

7. A device according to claim 6, wherein a thermally conducting foil cladding is provided at the rear side of the resistance heater member between the thermally insulating layer and the thermally conducting layer.

8. A device according to claim 7, wherein the thermally conducting foil is a self-adhesive foil.

9. A device according to claim 1, wherein a temperature sensor is provided in or upon the shell for regulating the switching of the power delivered to the at least one resistance heater member.

10. A device according to claim 1, comprising at least one resistance heater member providing a background power, and at least one further resistance heater member connectible through a temperature sensor.

11. A device according to claim 1, wherein said miniature tubular heater comprises a resistance heater wire surrounded by a metallic tube and spaced therefrom.

12. A device according to claim 11, wherein said metallic tube is spaced from said resistance heater wire by insulating material.

13. A device according to claim 12, wherein said miniature heating tube has a maximum diameter of approximately 3.5 mm.

14. A device according to claim 13, further comprising a thermally insulating layer provided between said shell and said part, said shell being formed of aluminum.

15. A device according to claim 14, wherein said resistance heater wire is a chrome-nickel wire, said tube surrounding said wire is a nickel tube, and said spacing material includes magnesium oxide powder.

16. A device according to claim 1, wherein said miniature tubular heater is at least in partial contact with the metallic shell.

* * * * *